United States Patent
Clinet et al.

(10) Patent No.: US 11,691,568 B2
(45) Date of Patent: Jul. 4, 2023

(54) ARTICULATING VISUAL AID WINGLET

(71) Applicant: FICOSA NORTH AMERICA CORPORATION, Madison Heights, MI (US)

(72) Inventors: Robin Clinet, Rochester Hills, MI (US); Bruno Lescroart, Troy, MI (US)

(73) Assignee: FICOSA NORTH AMERICA CORPORATION, Madison Heights, MI (US)

(*) Notice: Subject to any disclaimer, the term of this patent is extended or adjusted under 35 U.S.C. 154(b) by 301 days.

(21) Appl. No.: 16/993,581

(22) Filed: Aug. 14, 2020

(65) Prior Publication Data

US 2021/0046877 A1 Feb. 18, 2021

Related U.S. Application Data

(60) Provisional application No. 62/888,028, filed on Aug. 16, 2019.

(51) Int. Cl.
*B60R 1/076* (2006.01)
*B60R 11/04* (2006.01)
*B60R 1/12* (2006.01)
*B60R 11/00* (2006.01)

(52) U.S. Cl.
CPC .............. *B60R 1/076* (2013.01); *B60R 1/12* (2013.01); *B60R 11/04* (2013.01); *B60R 2001/1253* (2013.01); *B60R 2011/004* (2013.01)

(58) Field of Classification Search
CPC B60R 1/076; B60R 1/12; B60R 11/04; B60R 2001/1253; B60R 2011/004; B60R 1/074
See application file for complete search history.

(56) References Cited

U.S. PATENT DOCUMENTS

| | | | | |
|---|---|---|---|---|
| 4,728,181 A | * | 3/1988 | Kakinuma | B60R 1/06 248/478 |
| 5,818,650 A | * | 10/1998 | Nyhof | B60R 1/06 359/872 |
| 6,116,743 A | * | 9/2000 | Hoek | B60R 1/078 359/872 |
| 6,130,514 A | * | 10/2000 | Oesterholt | B60R 1/074 359/872 |
| 6,239,928 B1 | * | 5/2001 | Whitehead | B60R 1/078 359/872 |
| 6,390,630 B1 | * | 5/2002 | Ochs | B60R 1/074 248/478 |
| 6,880,940 B1 | * | 4/2005 | Binfet | B60R 1/06 248/478 |
| 9,845,054 B2 | | 12/2017 | Caballero Guirado et al. | |
| 2008/0204912 A1 | * | 8/2008 | Ekenhorst | B60R 1/0617 359/842 |
| 2017/0227084 A1 | * | 8/2017 | Ditzel | F16F 7/108 |

* cited by examiner

*Primary Examiner* — Sath V Perungavoor
*Assistant Examiner* — Tyler B Edwards
(74) *Attorney, Agent, or Firm* — Cantor Colburn LLP

(57) ABSTRACT

A visual aid winglet for a vehicle includes a visual aid, a housing, a base, and an articulating structure. The housing is adapted to house the visual aid. The articulating structure is engaged between the base and the housing and is adapted to pivot the housing with respect to the base. The articulating structure includes a metallic biasing member and a damper for the absorption of vibration.

19 Claims, 6 Drawing Sheets

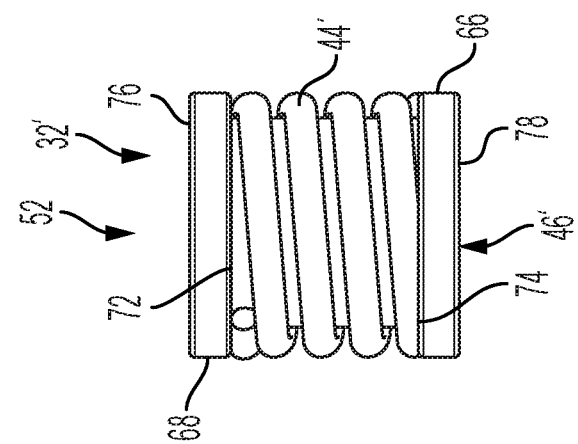
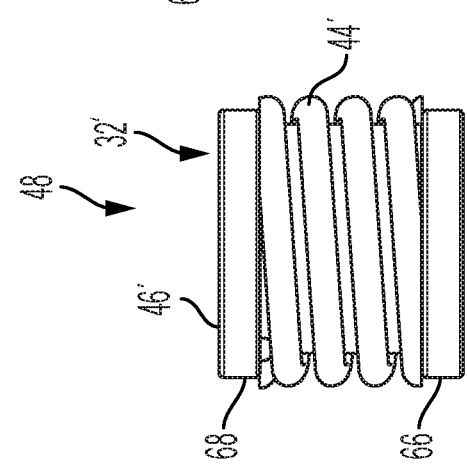
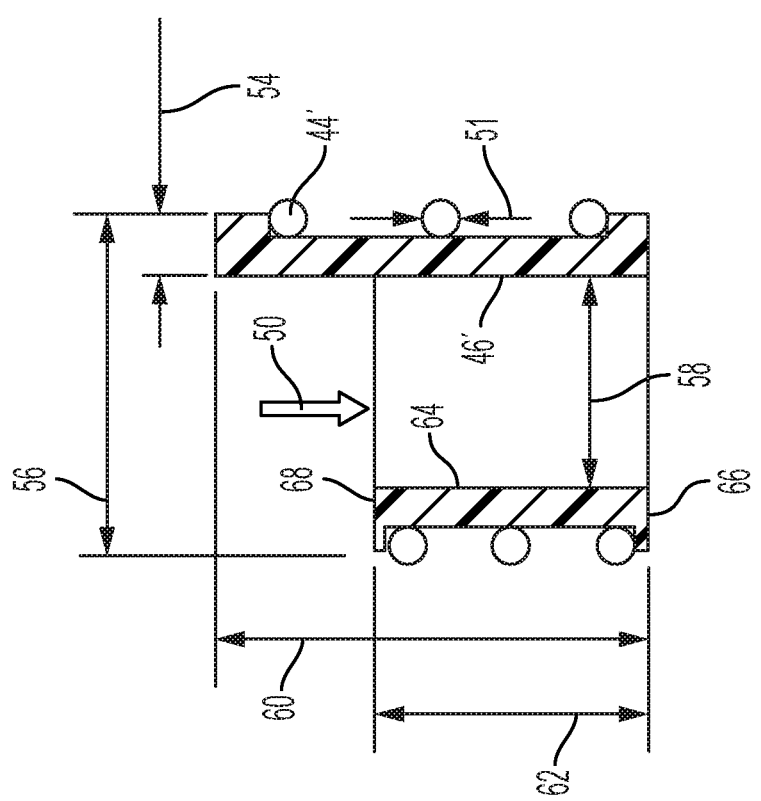
FIG. 6A
FIG. 6B
FIG. 6C

ARTICULATING VISUAL AID WINGLET

CROSS-REFERENCE TO RELATED APPLICATIONS

This application claims the benefit of U.S. Application Ser. No. 62/888,028 filed Aug. 16, 2019, the disclosure of which is incorporated herein by reference in its entirety.

BACKGROUND

The present disclosure relates to a visual aid winglet, and more particularly, to an articulating structure of the articulating visual aid winglet.

Articulating winglets, such as vehicle side view mirrors, are susceptible to vibration. Design alternatives that reduce vibration to improve visual clarity, while maintaining or reducing cost, component profile, and/or weight are desirable.

SUMMARY

A visual aid winglet for a vehicle according to one, non-limiting embodiment of the present disclosure includes a visual aid, a housing, a base, and an articulating structure. The housing is adapted to house the visual aid. The articulating structure is engaged between the base and the housing and is adapted to pivot the housing with respect to the base. The articulating structure includes a metallic biasing member and a damper for the absorption of vibration.

Additionally to the foregoing embodiment, the articulating structure is constructed to pivot the housing between a predefined retracted state and a protracted state.

In the alternative or additionally thereto, in the foregoing embodiment, the biasing member is a metallic spring member and the damper is elastomeric.

In the alternative or additionally thereto, in the foregoing embodiment, the damper is collinear with the spring member.

In the alternative or additionally thereto, in the foregoing embodiment, the damper is molded about the spring member.

In the alternative or additionally thereto, in the foregoing embodiment, the visual aid is at least one of a camera and a reflective surface.

In the alternative or additionally thereto, in the foregoing embodiment, the metallic spring member is adapted to absorb high amplitude and low frequency vibration, and the elastomeric damper is adapted to absorb low amplitude and high frequency vibration.

In the alternative or additionally thereto, in the foregoing embodiment, the visual aid winglet includes an annular shelf in fixed relationship to the housing and centered about the axis; and an annular shoulder in fixed relationship to the base, centered about the axis, and spaced axially from the annular shelf, wherein the metallic spring member and the elastomeric damper are adapted to be resiliently compressed axially between the annular shelf and the annular shoulder.

In the alternative or additionally thereto, in the foregoing embodiment, the articulating structure includes a hollow shaft disposed concentrically about the axis, the annular shelf is part of the housing, and the annular shoulder is part of the hollow shaft and projects radially outward.

In the alternative or additionally thereto, in the foregoing embodiment, the annular shelf defines an opening through which the hollow shaft extends.

In the alternative or additionally thereto, in the foregoing embodiment, the hollow shaft is fixedly attached to the base, and is axially displaceable with respect to the housing.

In the alternative or additionally thereto, in the foregoing embodiment, the metallic spring member is a spring centered about the axis and the elastomeric damper is molded about at least a portion of the spring.

In the alternative or additionally thereto, in the foregoing embodiment, the spring includes a first end portion in direct axial contact with annular shelf, and an opposite second end portion in direct axial contact with the annular shoulder.

In the alternative or additionally thereto, in the foregoing embodiment, the elastomeric damper includes a first end portion opposing and spaced axially from the annular shelf, and an opposite second end portion opposing and spaced axially from the annular shoulder.

In the alternative or additionally thereto, in the foregoing embodiment, the elastomeric damper includes a first end portion in direct axial contact with the annular shelf, and an opposite second end portion in direct axial contact with the annular shoulder.

In the alternative or additionally thereto, in the foregoing embodiment, the spring includes a first end portion opposing and spaced axially from the annular shelf, and an opposite second end portion opposing and spaced axially from the annular shoulder.

In the alternative or additionally thereto, in the foregoing embodiment, the elastomeric damper includes a cylindrical shape centered to the axis and displaced radial from the metallic spring member.

In the alternative or additionally thereto, in the foregoing embodiment, the cylindrical shape and metallic spring member are both in direct axial contact with the annular shoulder and the annular shelf.

In the alternative or additionally thereto, in the foregoing embodiment, the elastomer damper further includes a first end flange projecting radially outward from the cylindrical shape, and an opposite second end flange projecting radially outward from the cylindrical shape, and wherein the metallic spring member is located axially between and is in direct contact with the first and second end flanges.

In the alternative or additionally thereto, in the foregoing embodiment, the metallic spring member includes a first end portion and a second end portion, and one of the first and second end portions is in direct axial contact with the respective annular shelf and annular shoulder, and wherein the elastomeric damper includes a first end portion and a second end portion, and one of the first and second end portions of the elastomeric damper is in direct axial contact with the other of the respective annular shelf and the annular shoulder.

The foregoing features and elements may be combined in various combinations without exclusivity, unless expressly indicated otherwise. These features and elements, as well as the operation thereof, will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 6A is a bisectional cross section of a second embodiment of the biasing device in protracted and retracted states;

FIG. 6B is a side view of the biasing device in the protracted state;

FIG. 6 C is a side view of the biasing device in the retracted state; and

DETAILED DESCRIPTION

Figure 1:
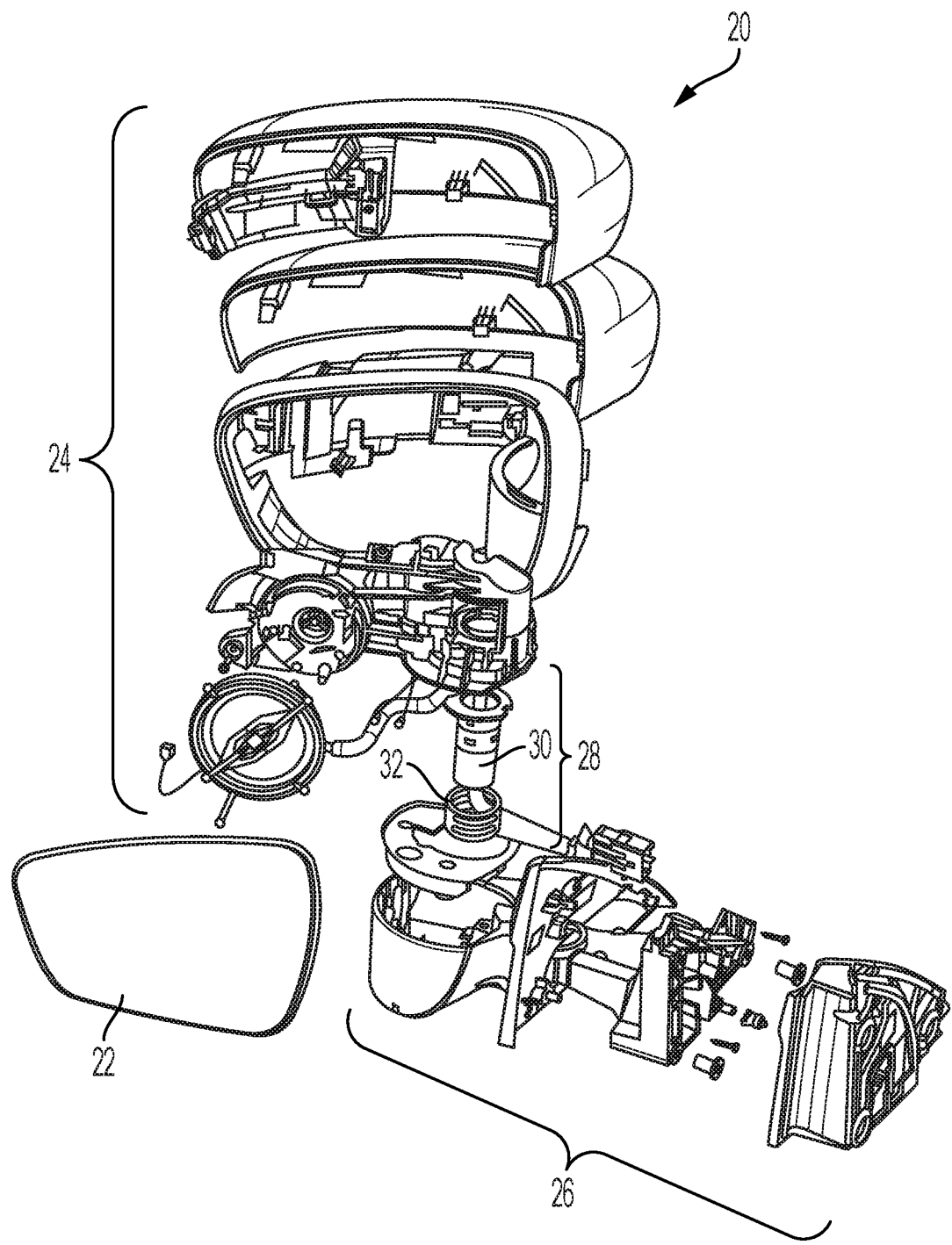
FIG. 1 is a disassembled perspective view of one exemplary, non-limiting, embodiment of a visual aid winglet.

Referring to FIG. 1, a visual aid winglet 20 is illustrated, and in one example, is adapted for use in a vehicle. The winglet 20 includes a visual aid 22, a visual aid housing 24, a base 26, and an articulating structure 28 (see FIG. 2). The articulating structure 28 facilitates the pivoting, or rotation, of the housing 24 with respect to the base 26 and about an axis A. The visual aid 22 is generally attached to the housing 24. In one application, the base 26 is adapted to rigidly fix to a vehicle (not shown). Examples of the visual aid 22 include a mirror pane (i.e., as illustrated), a camera, and other sensors constructed to provide a visual perspective. The visual aid winglet 20 may be a vehicle side winglet where the base 26 is attached to, for example, a driver and/or passenger door. In another embodiment, the base 26 may be adapted for attachment to a windshield of the vehicle (e.g., front windshield), or body or frame of the vehicle.

The articulating structure 28 may be of a hollow shaft type, also referred to as a quarter turn lock type, or tourillon type. In another embodiment, the articulating structure 28 may be a swivel type. The articulating structure 28 may be adapted to rotate about axis A, and between two predetermined angular positions. One angular position may be a non-driving retracted position where the housing 24 is folded inward (i.e., toward the vehicle) with respect to a longitudinal axis of the vehicle, and another angular position may be a driving protracted position where the housing 24 is unfolded and projects laterally outward from the vehicle (i.e., in the case of a side view winglet).

Figure 2:
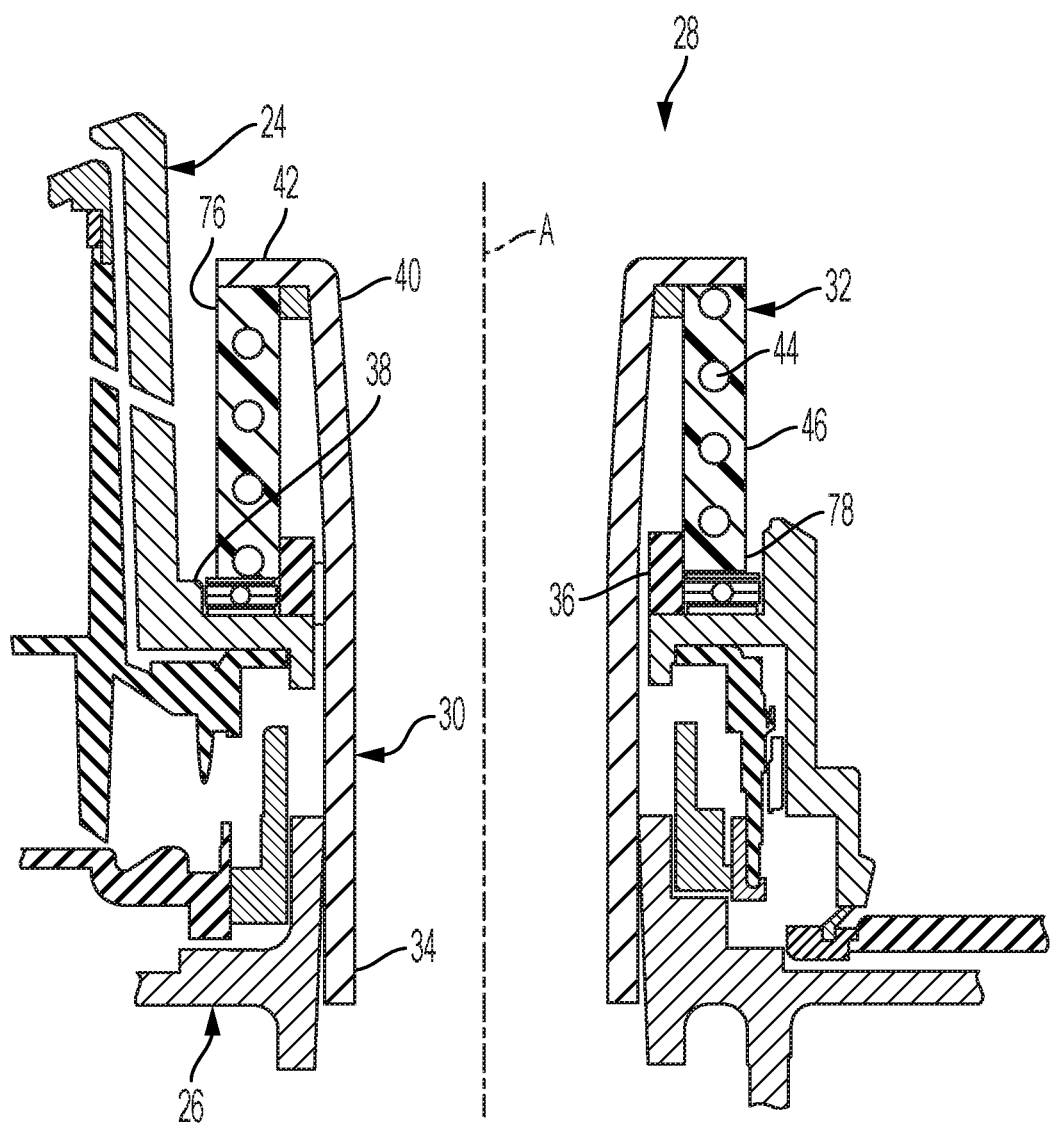
FIG. 2 is a cross section of an articulating structure of the visual aid winglet.

Referring to FIGS. 1 and 2, the articulating structure 28 includes a shaft 30 and a resilient biasing device 32. The shaft 30 extends along, and is centered to, the axis A, and may be hollow. When the winglet 20 is assembled, a first end portion 34 of the shaft is fixed, or attached, to the base 26, and projects outward through an opening 36 in the housing 24 generally defined by an annular shelf 38 of the housing 24 that projects radially inward with respect to axis A. An opposite end portion 40 of the shaft 30 includes a shoulder 42 that may be annular, and projects radially outward. The biasing device 32 is resiliently compressed axially between the shelf 38 of the housing 24 and the shoulder 42 of the shaft 30. In another embodiment, the hollow shaft 30 may be an integral, or unitary, part of the base 26. In yet another embodiment, the shaft 30 may be fixed to the housing 24 and the shelf 38 may be part of the base 26.

Figure 4:
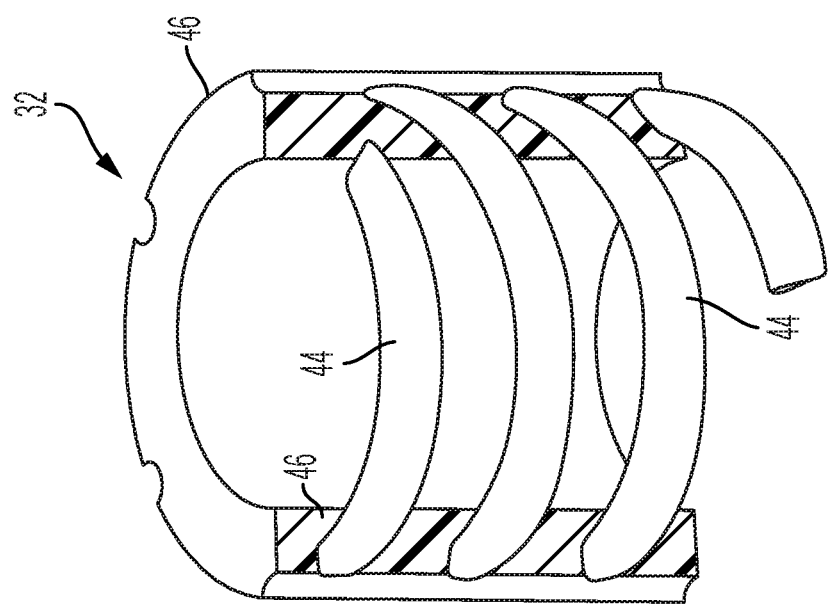
FIG. 4 is a perspective cross section of the biasing device.
Figure 3:
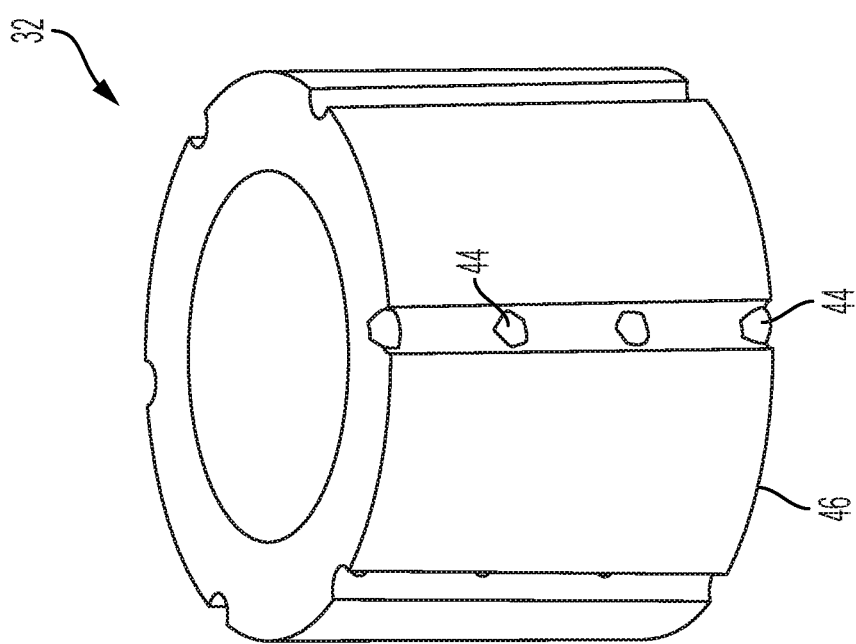
FIG. 3 is a perspective view of a biasing device of the articulating structure.
Figure 5A:
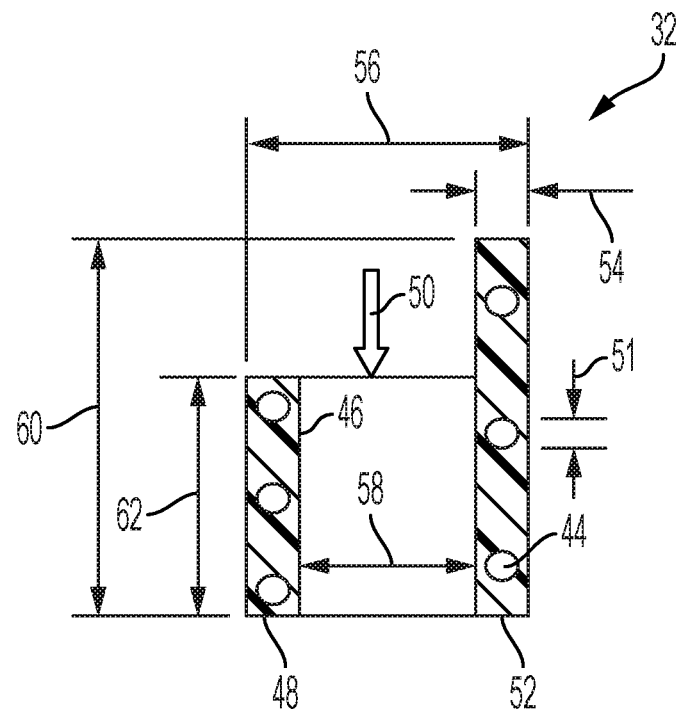
FIG. 5A is a bisectional cross section of the biasing device in protracted and retracted states.
Figures 5B, 5C:
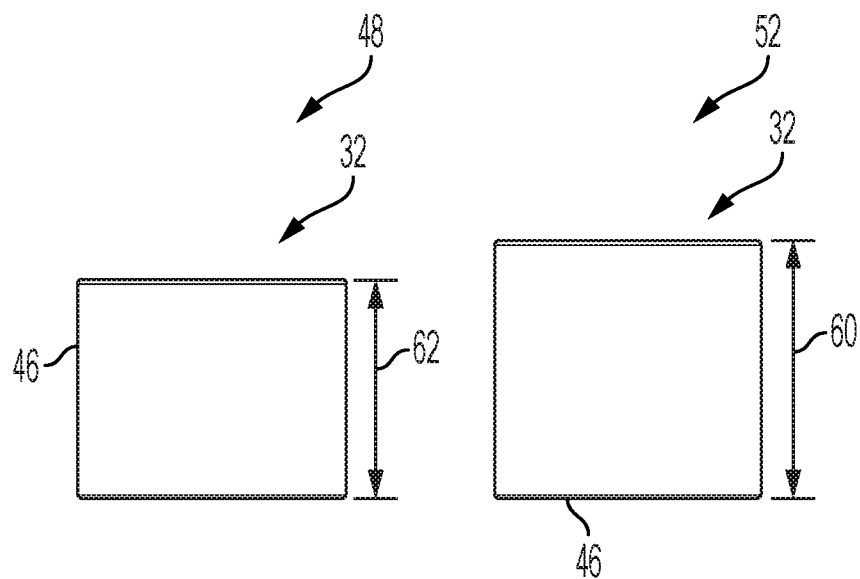
FIG. 5B is a side view of the biasing device in the protracted state.
FIG. 5C is a side view of the biasing device in the retracted state.

Referring to FIGS. 2-4, the resilient biasing device 32 of the articulating structure 28 includes a biasing member 44 and a damper 46. The biasing member 44 may be adapted to be resiliently, axially, compressible with respect to axis A, may be metallic, and may be a spring member and/or a spring. In one example, the spring is a coiled spring. The damper 46 is non-metallic, is adapted to be resiliently, axially, compressible with respect to axis A, may generally be cylindrical (e.g., a damper sleeve), and is made of an elastomeric material. Examples of elastomeric materials of the damper 46 include, but are not limited to, polyurethane (PU), thermoplastic polyurethane (TPU), thermoplastic elastomer (TPE), ethylene propylene diene monomer (EPDM), rubber, Cellasto® commercially available from BASF, and Vulkollan® commercially available from Bayer.

In one embodiment, and referring to FIGS. 3 and 4, the damper 46 of the biasing device 32 may be formed, or injection molded, about the biasing member 44 such that the member is substantially encapsulated by the damper 46. In one example, the damper 46 has greater flexibility, and/or compressibility, than the metallic biasing member 44, and the metallic biasing member 44 has greater flexibility than the hollow shaft 30 and the housing 24.

Referring to FIGS. 3, 4, and 5A-C, in operation of the visual aid winglet 20 and when in an unfolded, or protracted, state 48 (see FIG. 5B), the biasing device 32 is fully compressed exerting a maximum axial force (see arrow 50 in FIG. 5A) of about 63 Kgf. When in a free, folded, or retracted state 52 (see FIG. 5C), the biasing device 32 is fully, axially, extended. In one example, a wall thickness 54 of the damper 46 may be about 7.00 mm, an outer diameter 56 of the damper 46 may be about 41.00 mm, an inner diameter 58 of the damper 46 may be about 27.00 mm, and a diameter 51 of the spring wire (for example) of the biasing member 44 may be about 4.2 mm. When in the retracted state 52, the biasing device 32 may have an axial length 60 of about 26.00 mm, and when in the protracted state 48, the biasing device 32 may have an axial length 62 of about 21.00 mm.

When in the protracted state 48, the operating frequency range of the damper 46 for absorbing vibration is within a range of about 10 to 100 Hertz, and preferably (but not limited to) an operating frequency range of about 40 to 60 Hertz for optimal performance. Use of both the biasing member 44 with the damper 46 assists in minimizing any fatigue issues that may otherwise develop with sole use of the damper 46. Moreover, the biasing member 44 is generally designed to minimize high amplitude and low frequency vibration with respect to the housing 24 and thus the visual aid 22, while maintaining the winglet in the chosen retracted state 52 or the protracted state 48. During concurrent operation, the damper 46 is better suited to minimize low amplitude and high frequency vibration.

Referring to FIGS. 6A-C, a second embodiment of the biasing device is illustrated wherein like elements to the first embodiment have like identifying numerals except with the addition of a prime symbol suffix. The biasing device 32' includes a biasing member 44' and a damper 46'. In one example, the biasing member 44' is a metallic spring member. The damper 46' includes a cylindrical portion 64 that is located radially inward from the biasing member 44', and flanges 66, 68 disposed at opposite ends of the cylindrical portion 64 that project radially outward therefrom. During assembly, the flanges 66, 68 assist in pre-mounting the biasing member 44' to the damper 46'.

In operation of the visual aid winglet 20 and when in an unfolded, or protracted, state 48 (see FIG. 6B), the biasing device 32' is fully compressed exerting a maximum axial force (see arrow 50 in FIG. 6A) of about 63 Kgf. When in a free, folded, or retracted state 52 (see FIG. 6C), the biasing device 32' is fully, axially, extended. In one example, a wall thickness 54 of the flanges 66, 68 may be about 7.00 mm, an outer diameter 56 of the damper 46' may be about 41.00 mm, an inner diameter 58 of the damper 46' may be about 27.00 mm, and a diameter 51 of the spring wire (for example) of the biasing member 44 may be about 4.2 mm. When in the retracted state 52, the biasing device 32' may have an axial length 60 of about 26.00 mm, and when in the protracted state 48, the biasing device 32' may have an axial length 62 of about 21.00 mm.

In another embodiment, and although not specifically illustrated, the damper 46' may only include one of the flanges 66, 68, or may not include flanges at all. In yet another embodiment, the cylindrical portion 64 of the damper 46' may be located radially outward from the biasing member 44'.

Figure 7:
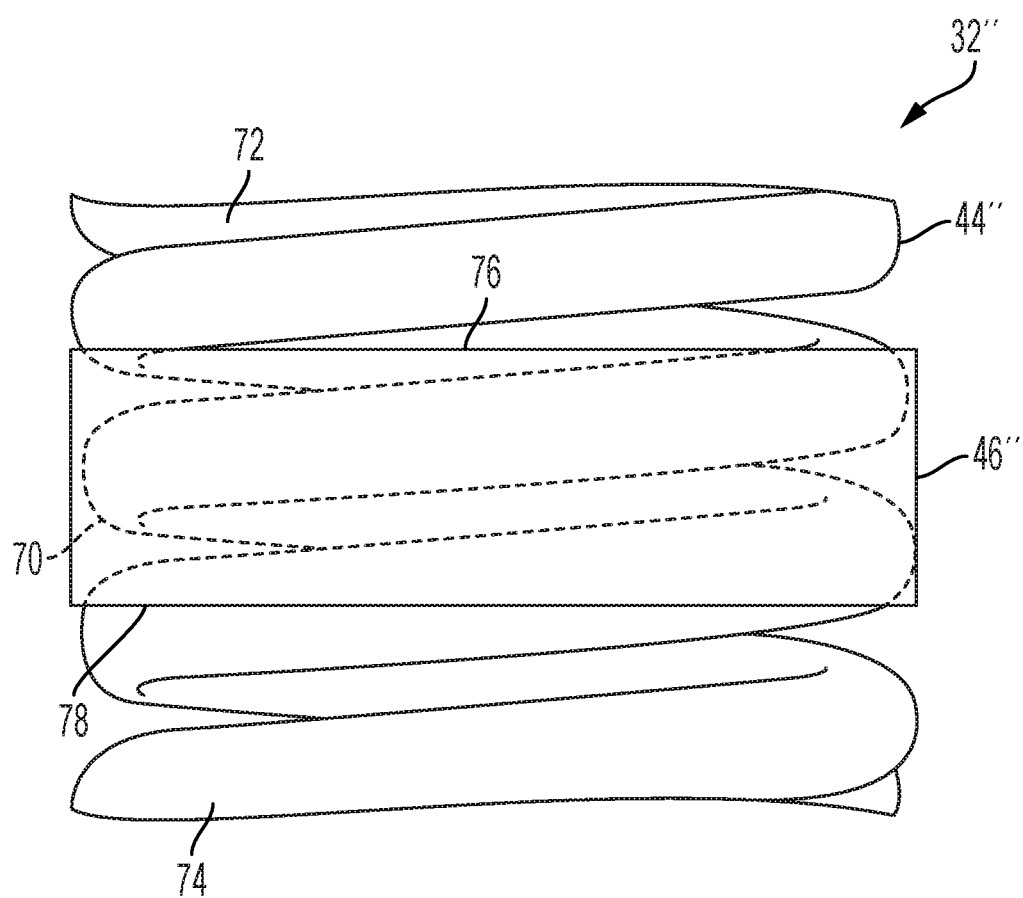
FIG. 7 is a side view of a third embodiment of the biasing device.

Referring to FIG. 7, a third embodiment of the biasing device is illustrated wherein like elements to the first and/or second embodiments have like identifying numerals except with the addition of a double prime symbol suffix. The biasing device 32" includes a biasing member 44" and a damper 46". In one example, the biasing member 44' is a metallic spring member, and the damper 46" is molded about, or otherwise encases, a mid portion 70 of the biasing member 44". The biasing member 44" further includes opposite, axial, end portions 72, 74 configured such that the mid portion 70 is located axially between the end portions 72, 74.

In one embodiment, the damper 46, in its entirety, may be a cylindrical shape. The cylindrical shape may be a core or a tube. In other embodiments, the mid portion 70 of the damper may be the cylindrical shape. Further still, and in another embodiment, at least one flange 66, 68 may project radially outward from the cylindrical shape.

With continued reference to FIG. 7 and when assembled, the end portions 72, 74 of the biasing member 44" are in direct contact with the respective shoulder 42 of the hollow shaft 30 and the shelf 38 of the housing 24 (see FIG. 2). The damper 46" includes opposite end portions 76, 78 that are opposed to, and axially spaced from, the respective shoulder 42 and shelf 38.

Referring again to FIG. 2, the end portions 76, 78 of the damper 46 (i.e., pertaining to the first embodiment of the biasing device 32) is in direct, axial, contact with the respective shoulder 42 and the shelf 38. In this embodiment (i.e., where the biasing member 44 is completely encased by the damper 46), the end portions 72, 74 of the biasing member 44 are axially spaced, and opposed to, the respective shoulder 42 and shelf 38.

It is further understood that the second embodiment of the biasing device 32' is similar to the first embodiment, in the sense that the end portions 72, 74 bare upon the flanges 68, 66 (i.e., part of the end portions 76, 78) and not directly upon the shoulder 42 and shelf 38.

In yet another embodiment, the visual aid 22 of the visual aid winglet 20 may be a camera, and the biasing device 32 may only include the damper 46 (i.e., does not include the biasing member 44). In this and other embodiments, further details are disclosed in U.S. Pat. No. 9,845,054, issued Dec. 19, 2017, titled: Rear-view Mirror Assembly for Motor Vehicles, which is incorporated herein by reference in its entirety.

Advantages and benefits of the present disclosure include an improved biasing device 32 that enables use of less expensive structural components. For example, portions or all of the base 26 and/or the housing 24 may be made of plastic as opposed to the more traditional aluminum or made of polypropylene as opposed to a more traditional nylon material. Other advantages may include a reduced profile of the biasing device 32 and thus a reduced profile of the winglet 20, thereby improving packaging and/or reducing wind load and improving fuel economy.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A visual aid winglet for a vehicle comprising:
   a visual aid;
   a housing adapted to house the visual aid;
   a base; and
   an articulating structure engaged between the base and the housing, adapted to pivot the housing with respect to the base about an axis, and the articulating structure including a metallic biasing member that is in direct contact with and encapsulated by a damper for the absorption of vibration.

2. The visual aid winglet set forth in claim 1, wherein the articulating structure is constructed to pivot the housing between a predefined retracted state and a protracted state.

3. The visual aid winglet set forth in claim 1, wherein the biasing member is a metallic spring member and the damper is elastomeric.

4. The visual aid winglet set forth in claim 1, wherein the visual aid is one or more of a camera and a reflective surface.

5. The visual aid winglet set forth in claim 3, wherein the metallic spring member is adapted to absorb vibration having a first amplitude and a first frequency, and the elastomeric damper is adapted to absorb vibration having a second amplitude that is lower than the first amplitude and a second frequency that is higher than the first frequency.

6. The visual aid winglet set forth in claim 3, further comprising:
   an annular shelf in fixed relationship to the housing and centered about the axis; and
   an annular shoulder in fixed relationship to the base, centered about the axis, and spaced axially from the annular shelf, wherein the metallic spring member and the elastomeric damper are adapted to be resiliently compressed axially between the annular shelf and the annular shoulder.

7. The visual aid winglet set forth in claim 6, wherein the articulating structure includes a hollow shaft disposed concentrically about the axis, the annular shelf is part of the housing, and the annular shoulder is part of the hollow shaft and projects radially outward.

8. The visual aid winglet set forth in claim 7, wherein the annular shelf defines an opening through which the hollow shaft extends.

9. The visual aid winglet set forth in claim 8, wherein the hollow shaft is fixedly attached to the base and is axially displaceable with respect to the housing.

10. The visual aid winglet set forth in claim 6, wherein the metallic spring member includes a first end portion in direct axial contact with annular shelf, and an opposite second end portion in direct axial contact with the annular shoulder.

11. The visual aid winglet set forth in claim 10, wherein the elastomeric damper includes a first end portion opposing and spaced axially from the annular shelf, and an opposite second end portion opposing and spaced axially from the annular shoulder.

12. The visual aid winglet set forth in claim 6, wherein the elastomeric damper includes a first end portion in direct axial contact with the annular shelf, and an opposite second end portion in direct axial contact with the annular shoulder.

13. The visual aid winglet set forth in claim 12, wherein the metallic spring member includes a first end portion opposing and spaced axially from the annular shelf, and an opposite second end portion opposing and spaced axially from the annular shoulder.

14. The visual aid winglet set forth in claim 6, wherein the elastomeric damper includes a cylindrical shape centered to the axis and displaced radial from the metallic spring member.

15. The visual aid winglet set forth in claim 14, wherein the cylindrical shape and metallic spring member are both in direct axial contact with the annular shoulder and the annular shelf.

16. The visual aid winglet set forth in claim 14, wherein the elastomer damper further includes at least one of a first end flange projecting radially outward from the cylindrical shape, and an opposite second end flange projecting radially outward from the cylindrical shape, and wherein the metallic spring member is in direct contact with at least one of the first and second end flanges.

17. The visual aid winglet set forth in claim 6, wherein the metallic spring member includes a first end portion and a second end portion, and one of the first and second end portions is in direct axial contact with the respective annular shelf and annular shoulder, and wherein the elastomeric damper includes a first end portion and a second end portion, and one of the first and second end portions of the elastomeric damper is in direct axial contact with the other of the respective annular shelf and the annular shoulder.

18. The visual aid winglet set forth in claim 1, wherein the biasing member includes a plurality of coils, the damper substantially encapsulating each of the plurality of coils.

19. The visual aid winglet set forth in claim 1, wherein the biasing member includes a plurality of coils having a first axial end, a second axial end opposite the first axial end, and an interior portion, the damper extending through the interior portion and encapsulating a coil at the first axial end and a coil at the second axial end.

\* \* \* \* \*